United States Patent
Lee et al.

(10) Patent No.: US 12,058,610 B2
(45) Date of Patent: Aug. 6, 2024

(54) ELECTRONIC DEVICE FOR VEHICLE AND OPERATING METHOD THEREOF

(71) Applicant: Samsung Electronics Co., Ltd., Gyeonggi-do (KR)

(72) Inventors: Kijeong Lee, Gyeonggi-do (KR); Woong Lee, Gyeonggi-do (KR); Changwon Jang, Gyeonggi-do (KR); Jaebum Jun, Gyeonggi-do (KR); Seungbum Ju, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 17/689,241

(22) Filed: Mar. 8, 2022

(65) Prior Publication Data
US 2023/0025797 A1 Jan. 26, 2023

Related U.S. Application Data

(63) Continuation of application No. PCT/KR2022/003013, filed on Mar. 3, 2022.

(30) Foreign Application Priority Data

Jul. 21, 2021 (KR) ........................ 10-2021-0095619

(51) Int. Cl.
*H04W 48/18* (2009.01)
*H04W 48/04* (2009.01)
(Continued)

(52) U.S. Cl.
CPC ............ *H04W 48/18* (2013.01); *H04W 48/04* (2013.01); *H04W 48/16* (2013.01); *H04W 84/042* (2013.01)

(58) Field of Classification Search
CPC ..... H04W 48/18; H04W 48/04; H04W 48/16; H04W 84/042; H04W 4/40; H04W 52/02;
(Continued)

(56) References Cited

U.S. PATENT DOCUMENTS 8,892,097 B2 11/2014 Manna et al.
9,247,388 B2 * 1/2016 Dini .................... G01S 5/02521
(Continued)

FOREIGN PATENT DOCUMENTS

KR 10-2010-0011566 A 2/2010
KR 10-2013-0092486 A 8/2013
(Continued)

OTHER PUBLICATIONS

International Search Report dated Jun. 9, 2022.

*Primary Examiner* — Don N Vo
(74) *Attorney, Agent, or Firm* — Cha & Reiter, LLC

(57) ABSTRACT

A vehicular electronic device and method thereof are disclosed herein. The electronic device includes memory, a network access device and a processor. The processor implements the method, including: monitoring, via at least one processor, whether a network access device of the electronic device enters a preset operation mode in which the network access device remains activated while a processor of the electronic device is in a sleep mode, based on detecting that the network access device enters the preset operation mode, identifying a network state of the network access device, based at least on the network state of the network access device, changing a search cycle of a network search as executed by the network access device, and executing the network search based on the changed search cycle.

20 Claims, 11 Drawing Sheets

(51) Int. Cl.
*H04W 48/16* (2009.01)
*H04W 84/04* (2009.01)

(58) Field of Classification Search
CPC ............. H04W 88/02; H04W 52/0258; H04W 52/0261; Y02D 30/70
USPC ...................................................... 455/432.3
See application file for complete search history.

(56) References Cited

U.S. PATENT DOCUMENTS

| | | |
|---|---|---|
| 9,474,046 B2 * | 10/2016 | Secades ................ H04W 68/12 |
| 10,471,893 B2 | 11/2019 | Moon et al. |
| 10,571,990 B2 | 2/2020 | Kim |
| 2009/0073871 A1 * | 3/2009 | Ko .................... H04W 52/0229 370/254 |
| 2015/0223151 A1 | 8/2015 | Lei et al. |
| 2017/0055201 A1 | 2/2017 | Murray et al. |
| 2018/0227839 A1 * | 8/2018 | Wang ...................... H04W 8/08 |
| 2019/0394719 A1 | 12/2019 | Soliman et al. |
| 2020/0067793 A1 | 2/2020 | Dribinski et al. |
| 2020/0245232 A1 * | 7/2020 | Yeh ........................ H04W 48/18 |
| 2021/0274438 A1 * | 9/2021 | Guan ................ H04W 52/0216 |
| 2021/0289431 A1 | 9/2021 | Kamata et al. |

FOREIGN PATENT DOCUMENTS

| | | |
|---|---|---|
| KR | 10-2016-0104314 A | 9/2016 |
| KR | 10-2252917 B1 | 5/2021 |
| WO | 2020/110838 A1 | 6/2020 |

* cited by examiner

ELECTRONIC DEVICE FOR VEHICLE AND OPERATING METHOD THEREOF

CROSS-REFERENCE TO RELATED APPLICATION(S)

This application is a continuation of International Application No. PCT/KR2022/003013, filed on Mar. 3, 2022, which claims priority to Korean Patent Application No. 10-2021-0095619, filed on Jul. 21, 2021 in the Korean Intellectual Property Office, the disclosures of which are herein incorporated by reference.

TECHNICAL FIELD

The disclosure relates to an electronic device for a vehicle, which performs a public land mobile network (PLMN) search.

BACKGROUND ART

Recently, vehicle manufacturers provide and manage a connected service remotely by mounting an electronic device in a vehicle. The electronic device mounted in the vehicle may maintain a communication connection between the vehicle and a network so as to continuously provide the connected service even when an engine of the vehicle is turned off.

When a public land mobile network (PLMN) obtained when an electronic device for a vehicle communicates with a network is a roaming network or a network in which some services are constrained due to there being no roaming agreement, the electronic device needs to periodically perform a PLMN search so as to obtain a service of a network having a higher priority, such as a home PLMN.

SUMMARY

Electronic devices and methods for searching for PLMN networks according to a present network state of the electronic device are disclosed.

A vehicular electronic device and a method operative in the vehicular electronic device are disclosed, for changing a PLMN search strategy according to a present network state of the vehicular electronic device.

According to an embodiment of the disclosure, an operating method of an electronic device for a vehicle, includes: monitoring, via at least one processor, whether a network access device of the electronic device enters a preset operation mode in which the network access device remains activated while a processor of the electronic device is in a sleep mode, based on detecting that the network access device enters the preset operation mode, identifying a network state of the network access device, based at least on the network state of the network access device, changing a search cycle of a network search as executed by the network access device, and executing the network search based on the changed search cycle.

According to another embodiment of the disclosure, an electronic device for a vehicle includes: a memory storing one or more instructions, a network access device, and a processor, wherein the one or more instructions are executable by the processor to cause the electronic device to: monitor whether the network access device enters a preset operation mode, in which the network access device remains activated while the processor is in a sleep mode, based on detecting that the network access device enters the preset operation mode, identify a network state of the network access device, based at least on the network state of the network access device, change a search cycle of a network search as executed by the network access device, and execute the network search based on the changed search cycle.

According to another embodiment of the disclosure, non-transitory computer-readable recording medium is provided, the medium having recorded thereon a program for executing, on an electronic device for a vehicle operations of: monitoring, via at least one processor, whether a network access device of the electronic device enters a preset operation mode in which the network access device remains activated while a processor of the electronic device is in a sleep mode, based on detecting that the network access device enters the preset operation mode, identifying a network state of the network access device, based at least on the network state of the network access device, changing a search cycle of a network search as executed by the network access device, and executing the network search based on the changed search cycle.

DETAILED DESCRIPTION

Figure 1:
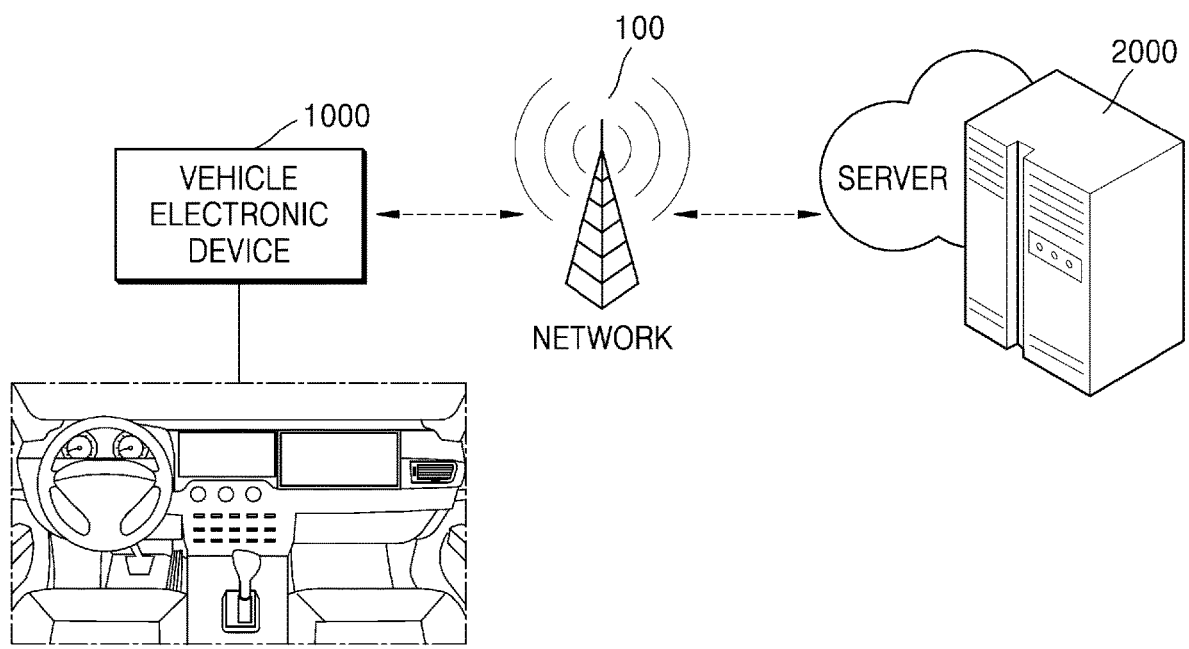
FIG. 1 is a diagram for describing a method, performed by an electronic device for a vehicle, of forming a communication connection with a server by searching for a network, according to an embodiment of the disclosure.

Throughout the disclosure, the expression "at least one of a, b or c" indicates only a, only b, only c, both a and b, both a and c, both b and c, all of a, b, and c, or variations thereof.

The terms used in the specification will be briefly defined, and the disclosure will be described in detail. All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

An expression used in the singular may encompass the expression in the plural, unless it has a clearly different meaning in the context. Terms used herein, including technical or scientific terms, may have the same meaning as commonly understood by one of ordinary skill in the art described in the disclosure.

When a part "includes" or "comprises" an element, unless there is a particular description contrary thereto, the part may further include other elements, not excluding the other elements. In addition, terms such as "unit" and "module" described in the specification denote a unit that processes at least one function or operation, which may be implemented in hardware or software, or implemented in a combination of hardware and software.

Hereinafter, embodiments of the disclosure will be described in detail with reference to the accompanying drawings such that one of ordinary skill in the art may easily implement the embodiments of the disclosure. However, the disclosure may be implemented in various different forms and is not limited to embodiments of the disclosure described herein. Also, in the drawings, parts irrelevant to the description are omitted in order to clearly describe the disclosure, and like reference numerals designate like elements throughout the specification.

According to an embodiment of the disclosure, a public land mobile network (PLMN) refers to a network arranged and operated by a communication service operator. The PLMN may include a unique identification code. The identification code of the PLMN may include a mobile country code (MCC) and a mobile network code (MNC).

According to an embodiment of the disclosure, a home PLMN (HPLMN) refers to a PLMN including identification codes of an MCC and MNC matching an MCC and MNC of an international mobile subscriber identity (IMSI) of a mobile communication terminal.

According to an embodiment of the disclosure, an equivalent HPLMN (EHPLMN) refers to a PLMN equivalent to an HPLMN. An equivalent PLMN (EPLMN) identification codes may be stored in a universal subscriber identity module (USIM) of a mobile communication terminal in a form of an EPLMN list, and may include an HPLMN code derived from an IMSI.

According to an embodiment of the disclosure, a registered PLMN (RPLMN) refers to a PLMN that has successfully completed its location registration due to a history of a mobile communication terminal having selected the PLMN.

According to an embodiment of the disclosure, a visited PLMN (VPLMN) refers to a PLMN other than an HPLMN or EHPLMN, which is obtained when a mobile communication terminal receives a service.

While describing the disclosure, a mobile communication terminal obtaining a PLMN will refer to an electronic device for a vehicle.

FIG. 1 is a diagram illustrated a method that is performed by an electronic device 1000 of a vehicle, for forming a communication connection with an external server 2000 by executing a search for a network 100, according to an embodiment of the disclosure.

Referring to FIG. 1, the electronic device 1000 of the vehicle (hereinafter, the electronic device 1000 installed to a vehicle, or a "vehicular" electronic device) may execute a search for a network 100 so as to perform data communication with the server 2000. When the connection is established, the electronic device 1000 may maintain communication connection with the network 100 when the vehicle is running, and also when the vehicle is deactivated (e.g., when an engine of the vehicle is turned off and systems are generally powered-down). The communication connection with the network 100 may be thus maintained in order to provide connective services remotely, at all times.

Further, the electronic device 1000 may perform execute data communication with the server 2000 external to the vehicle, using a network access device (NAD) included in the electronic device 1000.

When the vehicle is deactivated (e.g., turned off), the NAD may enter a preset operation mode to remotely provide communication services even when the vehicle engine is deactivated. Here, the NAD may operate the preset operation mode to maintain communication connection of the vehicle to the network, even when the engine of the vehicle is deactivated. For example, the preset operation mode may include a state in which the NAD remains operative even while a processor of the electronic device 1000 is placed into a sleep mode. The preset operation mode according to an embodiment of the disclosure may be referred to as a "network access device always on" (NAO) mode, but is not limited thereto.

Also, the electronic device 1000 may operate in an operation mode other than the preset operation mode. For example, the electronic device 1000 may operate in a normal mode, in which the processor and NAD included in the electronic device 1000 are both activated and operative.

The electronic device 1000 according to an embodiment of the disclosure may perform a search for the network 100, using the NAD.

According to an embodiment of the disclosure, the electronic device 1000 may perform a search for a PLMN providing a communication service, when the electronic device 1000 is initially activated. The PLMN may be a network operated by a communication service operator, and the PLMN to which the electronic device 1000 has a subscription may be referred to as an home PLMN or "HPLMN." In some cases, quality, speed, and service provided via the communication service to the electronic device 1000 may vary depending on whether the electronic device 1000 has an active subscription to the network operated and the communication service operator. Thus, the electronic device 1000 may execute the search for a PLMN and prioritize for connections certain PLMNs having higher preset priority (e.g., a PLMN known as a HPLMN may have more than one for which no subscription is active). The PLMN may be prioritized in a descending order including sub-tiers such as, for example, an HPLMN, a user controlled PLMN (UPLMN), an operator controlled PLMN (OPLMN), and a VPLMN, etc. but is not limited thereto. The electronic device 1000 may execute the network search at each preset search cycle as controlled via a PLMN search timer.

When the electronic device 1000 detects a VPLMN that is a PLMN having an insufficient priority, the electronic device 1000 may continue the search for a PLMN, so as to discover a PLMN belonging to a higher priority than the VPLMN (e.g., searching for a higher priority PLMN (HP-PLMN)). For example, the electronic device 1000 may then detect a HPPLMN when the electronic device 1000 is located within a coverage area of the HPPLMN. However, when the HPPLMN is not discovered, the electronic device 1000 may continue executing the network search for every preset search cycle of the PLMN search timer, until the HPLMN or EPLMN is finally obtained.

According to an embodiment of the disclosure, the electronic device 1000 may change a search operation for the communication connection with the network 100, when the NAD of the electronic device 1000 enters the preset operation mode. To change the search operation, the electronic device 1000 may monitor an operation mode of the NAD to identify whether the NAD enters the preset operation mode.

When it is identified that the NAD of the electronic device 1000 has entered the preset operation mode, the electronic device 1000 may identify a state of the network 100 via the NAD.

For example, when the identified state of the network 100 is "camped-on" for a VPLMN, the electronic device 1000 may search for an HPPLMN. In this case, the electronic device 1000 may change search operations for the HPPLMN.

As another example, the identified state of the network 100 may indicate constraints on available services, or no service whatsoever. For example, in a PLMN provided by an operator is detected (e.g., not the subscription-based service for the electronic device 100), a constrained service may be available (while other types of services are not), in which service is limited to emergency services, due to the absence of a roaming agreement, etc. As another example, the state may indicate no service, in which service is not provided, because, for example, a present location of the electronic device 1000 is not included in any coverage area of a PLMN. When the identified state of the network 100 is the constraint service state or the no service state, the electronic device 1000 may execute a search for a PLMN to return to a normal service state. In this case, the electronic device 1000 may search for an RPLMN or HPLMN, and the operations of searching for a PLMN may be changed depending on success of searching for the RPLMN or HPLMN.

The operations of searching for the HPPLMN by the electronic device 1000 may be changed in various methods. For example, the electronic device 1000 may not search for the HPPLMN or may increase a search cycle of searching for the HPPLMN. The electronic device 1000 may not perform an operation of searching for the HPPLMN or may increase the search cycle, thereby reducing power consumed by the electronic device 1000 to obtain the communication service.

Specific methods of the electronic device 1000 obtaining a PLMN, according to an embodiment of the disclosure, will be described in detail below.

Figure 2:
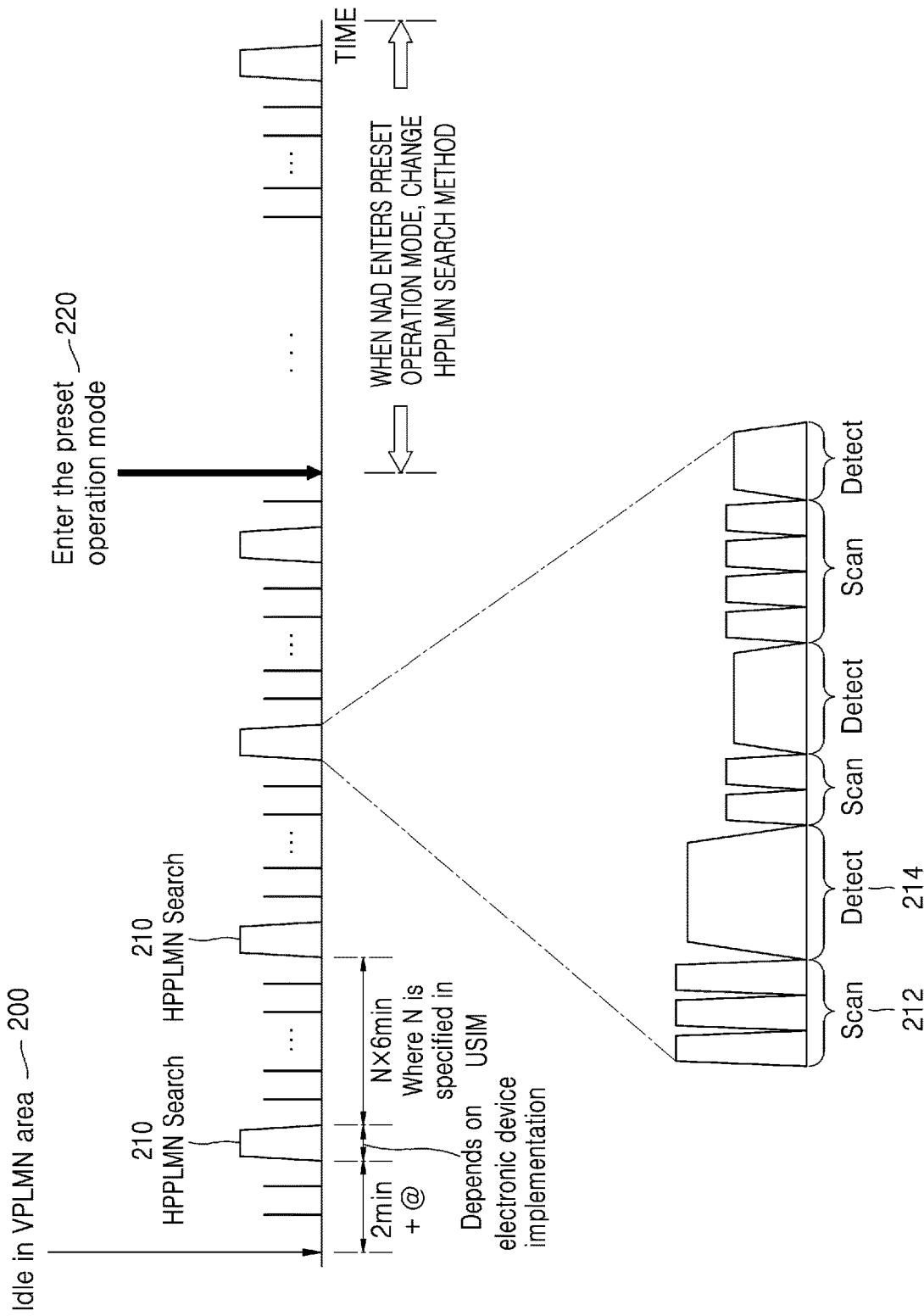
FIG. 2 is a diagram for describing a method, performed by an electronic device for a vehicle, of searching for another public land mobile network (PLMN) while a visited public land mobile network (VPLMN) is obtained, according to an embodiment of the disclosure.

FIG. 2 is a diagram for describing a method, performed by the electronic device 1000, of searching for another PLMN while a VPLMN is obtained, according to an embodiment of the disclosure.

While describing FIG. 2, the electronic device 1000 according to an embodiment of the disclosure has detected a VPLMN, and is disposed in an idle mode within a VPLMN area by camping on the VPLMN. The idle mode refers to a state in which power is activated, but a dedicated channel is not yet assigned for the electronic device 1000. Also, when the electronic device 1000 has obtained the VPLMN, the electronic device 1000 may be in a roaming state.

Referring to FIG. 2, when the electronic device 1000 according to an embodiment of the disclosure has obtained the VPLMN, the electronic device 1000 may periodically attempt to access an HPPLMN.

Here, the HPPLMN refers to a PLMN having a higher priority tier than the VPLMN. The HPPLMN may be, for example, an "home" HPLMN or an "equivalent" EHPLMN (e.g., equivalent to home), but is not limited thereto.

For example, when there is no EHPLMN list in the electronic device 1000 or an EHPLMN list is empty, the electronic device 1000 may periodically re-execute an HPPLMN search 210.

As another example, when an EHPLMN is detected in a prestored EHPLMN list of the electronic device 1000, the electronic device 1000 may periodically perform the HPPLMN search 210 to obtain the detected EHPLMN service indicated in the list.

According to an embodiment of the disclosure, when a preset period of time elapses while the electronic device 1000 is in an idle state 200 in the VPLMN area, the electronic device 1000 may periodically re-execute the HPPLMN search 210 to attempt to access the HPPLMN. For example, when at least 2 minutes have passed while the electronic device 1000 is in the idle state 200 in the VPLMN area, the electronic device 1000 may periodically perform the HPPLMN search 210.

According to an embodiment of the disclosure, the electronic device 1000 may execute an HPPLMN search 210 for a PLMN that has a higher priority than the presently-known VPLMN. For example, an operation of the HPPLMN search 210 of the electronic device 1000 may include periodic repeating of a scanning operation 212 and a detecting operation 214 on the HPPLMN accessible at a current location of the electronic device 1000. The HPPLMN search 210 may be attempted for a preset quantity of time. Here, the preset time may vary depending on a setting value implemented in the electronic device 1000.

According to an embodiment of the disclosure, when the HPPLMN search 210 is successful and detects a HPPLMN, the electronic device 1000 may access the HPPLMN to establish a connection to the same obtain service from the HPPLMN. Here, the HPPLMN may include the HPLMN or EPLMN, but is not limited thereto.

When the HPPLMN search 210 fails and no HPPLMN is detected, the electronic device 1000 may re-perform the HPPLMN search 210, according the preset search cycle. Here, a preset search cycle "T" may be stored in a USIM of the electronic device 1000.

The preset search cycle T may have a value of N×6 minutes (here, N is a value between 0 and 255). For example, when N=1, the electronic device 1000 may perform the HPPLMN search 210 every T=6 minutes (e.g., on a cycle of 1×6). As another example, when N=2, the electronic device 1000 may perform the HPPLMN search 210 every T=12 minutes (e.g., on a cycle of 2×6). However, an embodiment of the disclosure is not limited thereto, and T may be set as various values according to an embodiment of the disclosure.

Also, when the preset search cycle is not stored in the USIM, the electronic device 1000 may repeat performing the HPPLMN search 210 based on some default time (e.g., every 60 minutes) of the search cycle.

The electronic device 1000 according to an embodiment of the disclosure may identify that the NAD of the electronic device 1000 has entered a preset operation mode 220. Here, the preset operation mode 220 may be a state in which only the NAD of the electronic device 1000 operates while the processor included in the electronic device 1000 is in a sleep mode.

When it is identified that the NAD of the electronic device 1000 has entered the preset operation mode 220, a method by which the electronic device 1000 performs the HPPLMN search 210 may be changed. This will be described below.

Figure 3:
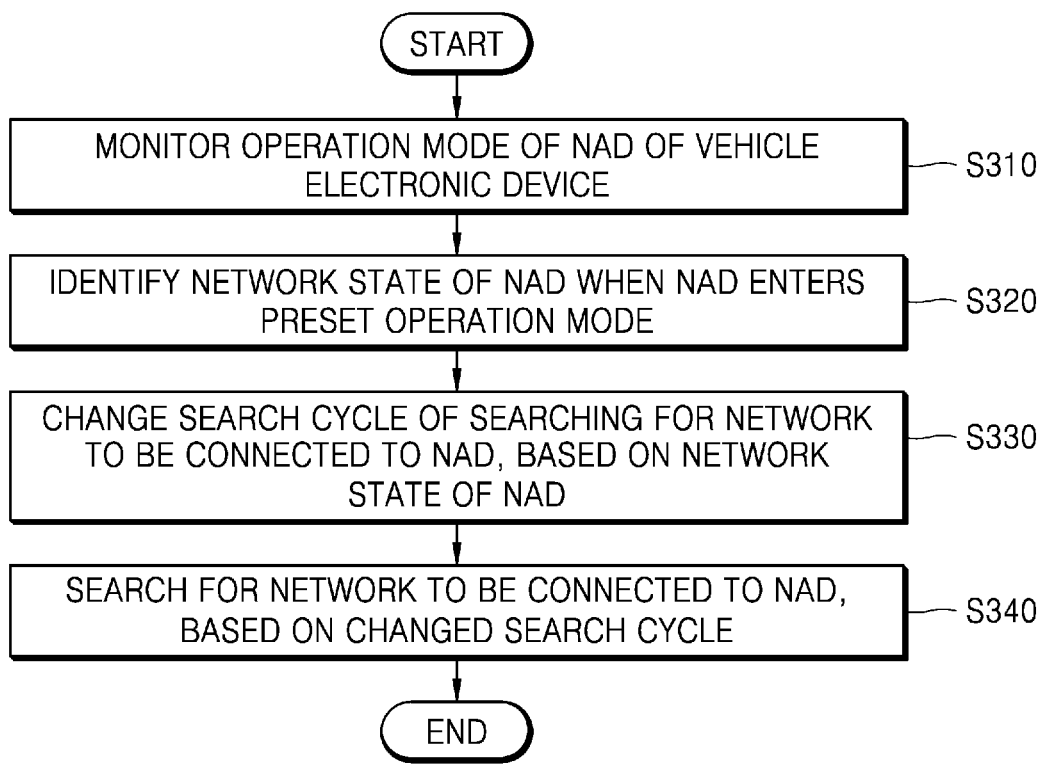
FIG. 3 is a flowchart of a method, performed by an electronic device for a vehicle, of searching for a higher priority PLMN while a VPLMN is obtained, according to an embodiment of the disclosure.

FIG. 3 is a flowchart of a method, performed by the electronic device 1000, of searching for an HPPLMN while a VPLMN is known, according to an embodiment of the disclosure.

In operation S310, the electronic device 1000 according to an embodiment of the disclosure may monitor an operation mode of the NAD of the electronic device 1000.

For example, when an engine of a vehicle is activated, i.e., when the engine is ignited, presenting being operated, and/or idling, the NAD may be considered to be operating in a normal mode. Here, the normal mode refers to a mode in which both the processor and NAD included in the electronic device 1000 are active.

The electronic device 1000 may identify that the NAD is entering a preset operation mode while monitoring the operation mode of the NAD. The preset operation mode may be referred to as an NAO mode (e.g., NAD-always-on mode), and denotes a state in which the NAD continues to operate while the processor included in the electronic device 1000 is in a sleep mode (e.g., if the vehicle is deactivated and engine is shut off).

In operation S320, the electronic device 1000 according to an embodiment of the disclosure may identify a network state of the NAD, when the NAD enters the preset operation mode (e.g., the NAO mode).

For example, the electronic device 1000 may identify that the network state of the NAD is a roaming state because a network presently accessed by the NAD is a VPLMN. Alternatively, the electronic device 1000 may identify that the network state of the NAD is a constraint service state in which at least some functions of a communication service are constrained, because the network accessed by the NAD is a PLMN of another communication service operator and lacks a roaming agreement for full service provision. Alternatively, the electronic device 1000 may identify that the NAD has not accessed any PLMN whatsoever, and is thus in a no service state in which no communication service is provided. Also, the electronic device 1000 may identify whether the network accessed by the NAD has obtained an HPLMN or EHPLMN.

In operation S330, the electronic device 1000 according to an embodiment of the disclosure may change a search cycle of searching for a network to be connected to the NAD, based on the network state of the NAD.

According to an embodiment of the disclosure, the electronic device 1000 may periodically search for another PLMN, in an attempt to connect to a PLMN having a higher priority (and thus, an increased availability of service), when the NAD has not detected the HPLMN or EHPLMN. In other words, when the network state of the NAD is one of a roaming state, constraint service state, or no service state, the electronic device 1000 may execute a search for a PLMN, based on the preset search cycle T.

The preset search cycle T of the electronic device 1000 may be utilized for executing a period search for the HPPLMN that is another PLMN having a high priority and may be stored in a USIM of the electronic device 1000.

When the NAD enters the preset operation mode, the electronic device 1000 may change a method of searching for the HPPLMN, while the NAD continues to operate in the preset operation mode.

According to an embodiment of the disclosure, the electronic device 1000 may change the search cycle of the electronic device 1000 while searching for the HPPLMN, based on the identified network state. For example, the electronic device 1000 may increase the search cycle T of searching for the HPPLMN. In detail, when the search cycle T is T=6 minutes, the electronic device 1000 may repeat the search for the HPPLMN every 6 minutes. In this case, the electronic device 1000 may change the search cycle T to T=120 minutes to decrease the number of searches for the HPPLMN per hour.

As another example, the electronic device 1000 may change a value of the search cycle T of searching for the HPPLMN to T=0. When the value of the search cycle T is changed to 0, the electronic device 1000, search operations for the HPPLMN may be terminated.

In operation S340, the electronic device 1000 according to an embodiment of the disclosure may execute the network search, based on the changed search cycle. Assuming a qualifying PLMN is discovered, the electronic device 1000 may connect to the PLMN via the NAD, when the detected PLMN indicates the desired priority. The respective priority of PLMNS for connection can be prioritized in a descending order of, for example, an HPLMN, a UPLMN, and then an OPLMN.

According to an embodiment of the disclosure, when the search cycle T is increased in value, the electronic device 1000 may perform the operation of searching for the HPPLMN, based on the increased search cycle. Accordingly, the number of searches for the HPPLMN is reduced in repetition over time, thereby reducing power consumed by the electronic device 1000.

According to an embodiment of the disclosure, when the search cycle of searching for the HPPLMN is changed to 0, the search operations may be terminated. Accordingly, the electronic device 1000 may further reduce power consumption in attempting to detect and connect to the communication service.

Figure 4:
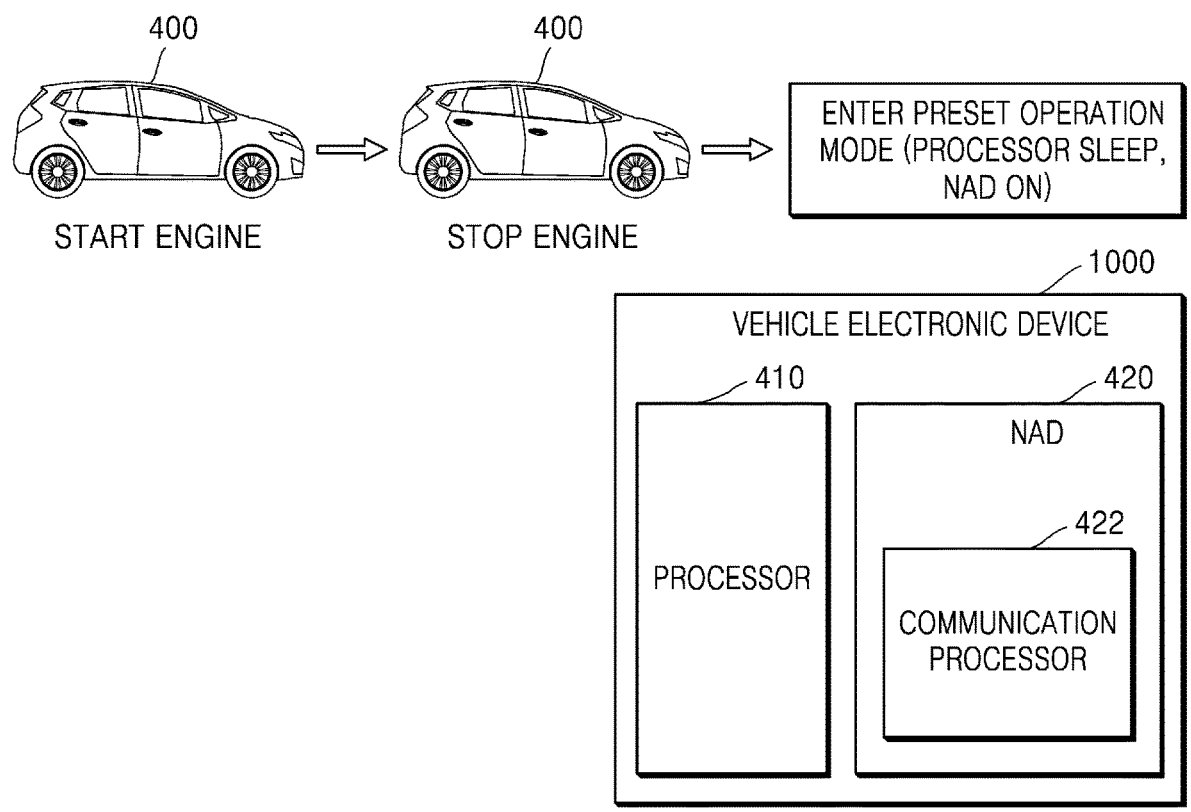
FIG. 4 is a diagram for describing an electronic device for a vehicle, entering a preset operation mode, according to an embodiment of the disclosure.

FIG. 4 is a diagram for describing the electronic device 1000 entering a preset operation mode, according to an embodiment of the disclosure.

The electronic device 1000 according to an embodiment of the disclosure may at least include a processor 410 and an NAD 420. The NAD 420 may include a communication processor 422.

According to an embodiment of the disclosure, when a vehicle 400 is running and/or idling with the engine on, the NAD 420 of the electronic device 1000 may be considered to be operating in a normal mode. Here, the normal mode refers to a mode in which both the processor 410 and NAD 420 included in the electronic device 1000 are activated.

When the NAD 420 of the electronic device 1000 is operating in the normal mode, the electronic device 1000 receives power from at least a battery in the vehicle 400. Here, because the engine of the vehicle 400 is active, the battery in the vehicle 400 may be continually charged using electric energy converted from kinetic energy generated from rotation of the engine (e.g., via an alternator)

According to an embodiment of the disclosure, the NAD 420 of the electronic device 1000 may enter a preset operation mode while operating in the normal mode. However, the disclosure does not mandate that the preset operation mode starts from within the normal mode, and it is understood that the NAD 420 may enter the preset operation mode while operating in another operation mode. Also, the preset operation mode may be a default mode and the NAD 420 may be operating in the preset operation mode.

When the engine of the vehicle 400 is shut off, the NAD 420 may enter the preset operation mode to continue providing communication services even when the engine of the vehicle 400 is deactivated. Here, in the preset operation mode, the NAD 420 continues operations to maintain a communication connection of the vehicle 400, even when the engine of the vehicle 400 is deactivated and the processor 410 is in a sleep state.

When the NAD 420 of the electronic device 1000 operates in the preset operation mode, the electronic device 1000 may receive operational power from the battery in the vehicle 400. In this case, because the engine of the vehicle 400 is not running, the battery in the vehicle 400 is not being charged, and the overall level of electrical energy of the charged battery will be depleted as the NAD 420 operates in the preset operation mode.

According to an embodiment of the disclosure, it has been described that the NAD 420 enters the preset operation mode when the engine of the vehicle 400 is deactivated, but the disclosure is not limited thereto, and the preset operation mode may indicate a case where the processor 410 of the electronic device 1000 is in a sleep state and the NAD 420 operates.

Figure 5:
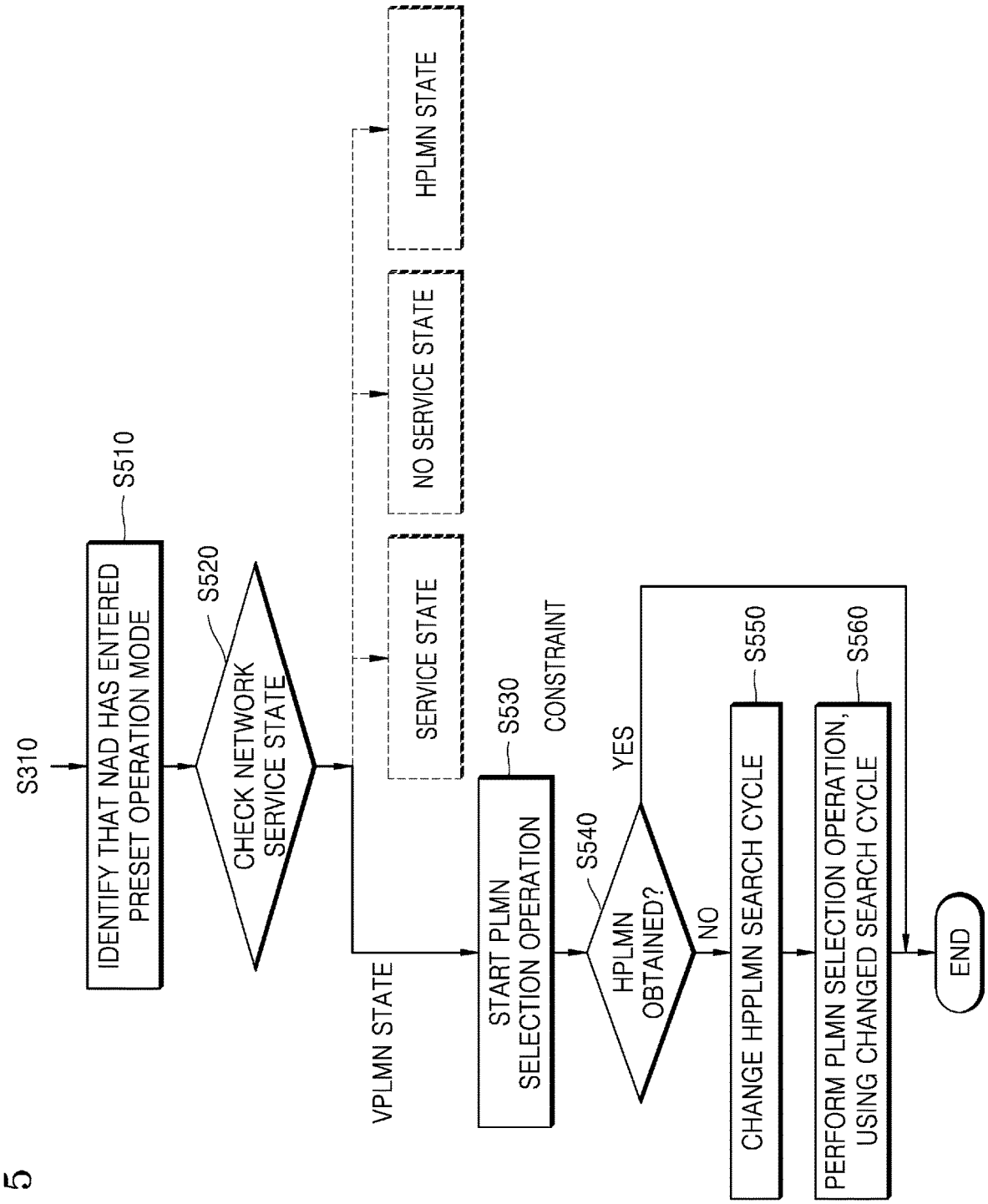
FIG. 5 is a flowchart for describing a method, performed by an electronic device for a vehicle, of changing operations of searching for a higher priority PLMN, when the electronic device operates in a preset operation mode and is connected to a VPLMN, according to an embodiment of the disclosure.

FIG. 5 is a flowchart for describing a method, performed by the electronic device 1000, of changing operations of searching for a HPPLMN, when the electronic device 1000 operates in a preset operation mode and is connected to a VPLMN, according to an embodiment of the disclosure.

While describing FIG. 5, operation S510 may be performed after operation S310 of FIG. 3 of monitoring an operation mode of an NAD.

In operation S510, the electronic device 1000 according to an embodiment of the disclosure may identify that the NAD has entered a preset operation mode (e.g., the vehicle has been deactivated, the engine is no longer running, and the processor is in a sleep mode, while the NAD continues operating). Because this has been described in the above embodiments of the disclosure, redundant descriptions are omitted.

In operation S520, the electronic device 1000 according to an embodiment of the disclosure may detect a network service state of the NAD. For example, the electronic device 1000 may detect whether the NAD is presently disposed in a VPLMN-connected state (roaming state), a constraint service state, a no service state, or an HPLMN-connected state.

The electronic device 1000 according to an embodiment of the disclosure may perform operation S530 when it is identified that the network state obtained by the NAD is the VPLMN-connected state. In other embodiments, operation S530 may be performed when the constraint service state and no service state are detected as well.

In operation S530, the electronic device 1000 according to an embodiment of the disclosure may initiate a PLMN selection operation. Here, the PLMN selection operation denotes an operation searching for a new PLMN, and selecting a PLMN for connection from among detected PLMNs. Here, because a current network state is VPLMN, the PLMN selection operation denotes an operation of searching for a HPPLMN. The HPPLMN may be an HPLMN (e.g., a home PLMN).

According to an embodiment of the disclosure, the PLMN selection operation may be performed one time or may be re-executed a plurality of times based on a preset search cycle. The electronic device 1000 may perform operation S540 after performing the PLMN selection operation one time or a plurality of times based on the preset search cycle.

In operation S540, the electronic device 1000 according to an embodiment of the disclosure may determine whether the NAD has detected a HPPLMN. The electronic device 1000 may reidentify the network service state of the NAD to identify whether the NAD has detected and connected to the HPPLMN. When the NAD has connected to the HPPLMN, the electronic device 1000 may end the PLMN selection operation. When the NAD has not connected to the HPPLMN, the electronic device 1000 may perform operation S550, in which searching continues.

In operation S550, the electronic device 1000 according to an embodiment of the disclosure may change a search cycle of the HPPLMN. Here, the HPPLMN search cycle before the change may be a preset search cycle, and may be stored in a USIM of the electronic device 1000.

According to an embodiment of the disclosure, the electronic device 1000 may change the search cycle of the HPPLMN, by increasing the preset search cycle. For example, the preset HPPLMN search cycle may initially be set to T=6 minutes. In this case, the electronic device 1000 may change the preset HPPLMN search cycle from 6 minutes to T=120 minutes and store the changed search cycle in the USIM.

In operation S560, the electronic device 1000 according to an embodiment of the disclosure may perform the PLMN selection operation, based on the changed search cycle. For example, when the HPPLMN search cycle is changed from 6 minutes to 120 minutes, the electronic device 1000 may perform the PLMN selection operation of searching for the HPPLMN every 120 minutes to access the HPPLMN.

Figure 6:
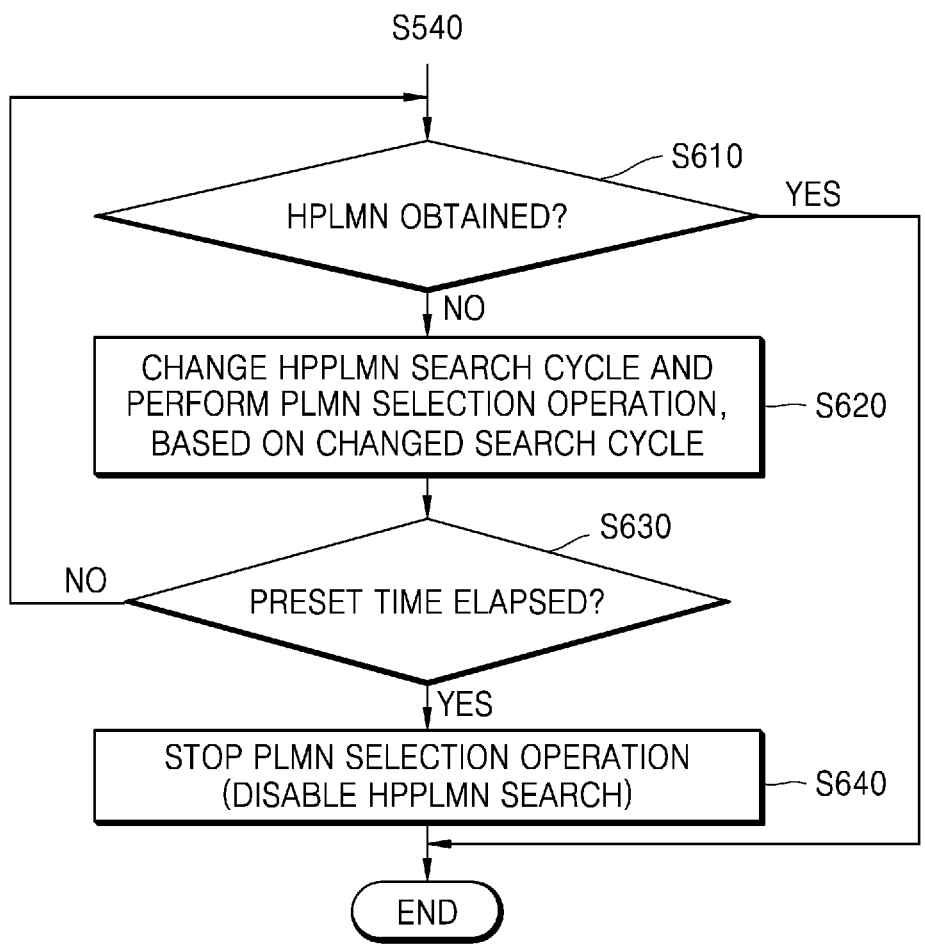
FIG. 6 is a flowchart for further describing a method, performed an electronic device for a vehicle, of changing operations of searching for a higher priority PLMN, when the electronic device operates in a preset operation mode and is connected to a VPLMN, according to an embodiment of the disclosure.

FIG. 6 is a flowchart for further describing a method, performed by the electronic device 1000, of changing operations of searching for an HPPLMN, when the electronic device 1000 operates in a preset operation mode and is connected to a VPLMN, according to an embodiment of the disclosure.

While describing FIG. 6, operations S610 through S640 may be performed after operation S530 of FIG. 5 is performed. In this case, operations S540 through S560 of FIG. 5 may be replaced by operations S610 through S640.

In operation S610, the electronic device 1000 according to an embodiment of the disclosure may identify whether the NAD has detected and connected to an HPLMN. When the NAD has connected the HPLMN (e.g., that satisfies the qualifications of an HPPLMN), the electronic device 1000 may terminate the PLMN selection operation. When the NAD has not connected to the HPPLMN, the electronic device 1000 may perform operation S620.

In operation S620, the electronic device 1000 according to an embodiment of the disclosure may change the search cycle of the HPPLMN and repeat execution of the PLMN selection operation, based on the changed search cycle. Because operation S620 corresponds to operations S550 and S560 of FIG. 5, redundant descriptions thereof are omitted.

In operation S630, the electronic device 1000 according to an embodiment of the disclosure may determine whether a preset time has elapsed after changing the search cycle of HPPLMN. That is, the electronic device 1000 may determine whether a preset time has elapsed after a time point in which the NAD enters the preset operation mode, connects to the VPLMN, and changes the search cycle of the HPPLMN, the electronic device 1000 may identify whether a preset time has elapsed. When the preset time has not elapsed, the electronic device 1000 returns to operation S610 to identify whether the NAD has obtained the HPLMN again. Also, when the preset time has elapsed, the electronic device 1000 may perform operation S640.

For example, the HPPLMN search cycle T may be defined to be N×6 minutes (e.g., here, N is a value between 0 and 255), the preset search cycle stored in the USIM of the electronic device 1000 may be 6 minutes (N=1), and the changed search cycle may be 120 minutes (N=20). Also, the preset time may be 1530 minutes (N=255, the maximum value of N). The electronic device 1000 may perform operation S640 when the preset time, i.e., 1530 minutes, elapses.

In operation S640, the electronic device 1000 according to an embodiment of the disclosure may terminate the PLMN selection operation. When the preset time elapses, the electronic device 1000 may disable the HPPLMN search. The electronic device 1000 may change the HPPLMN search cycle T to 0 (N=0) to terminate the PLMN selection operation, causing the electronic device 1000 to cease performance of all HPPLMN searches.

Figure 7:
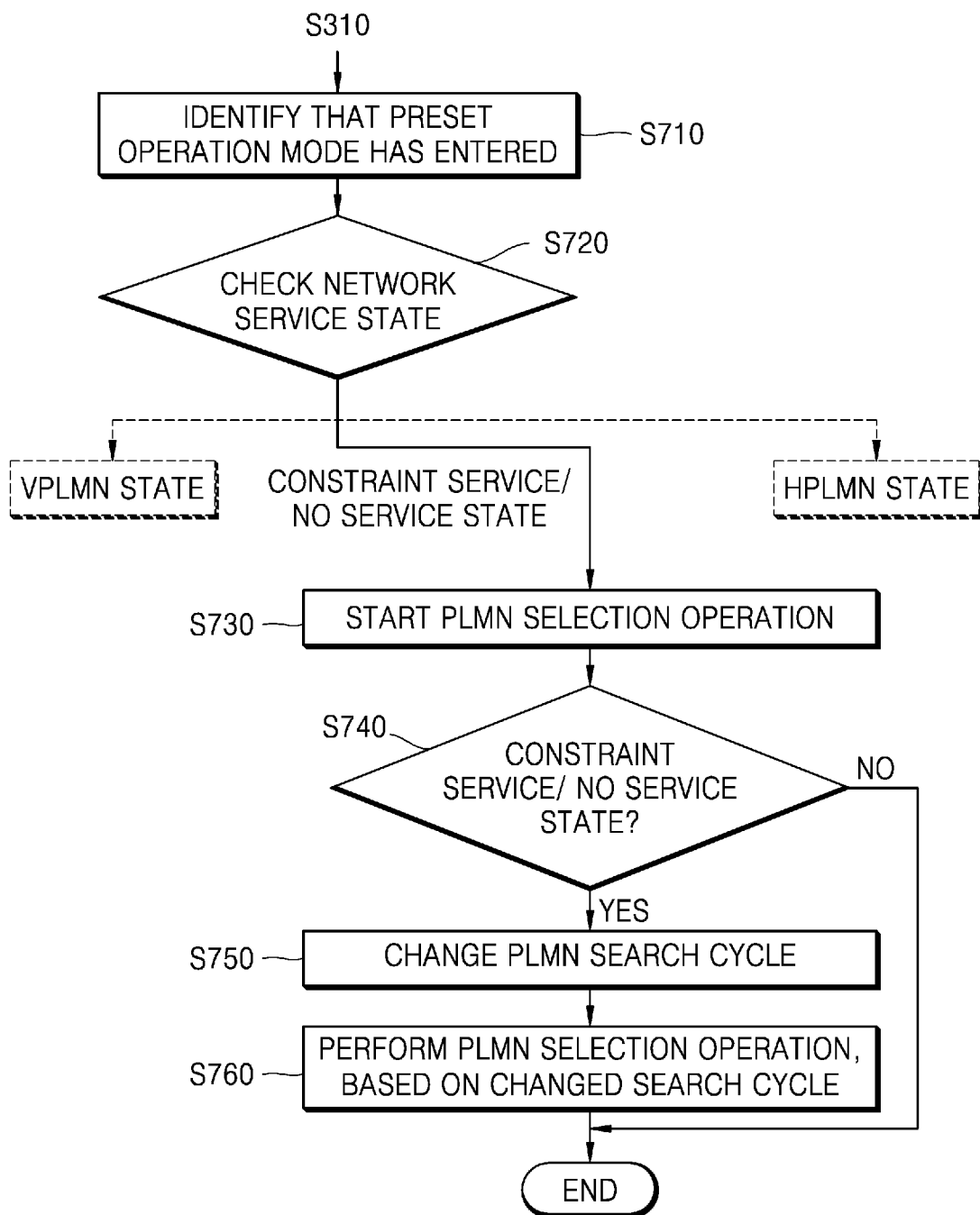
FIG. 7 is a flowchart for describing a method, performed by an electronic device for a vehicle, of changing operations of searching for a PLMN, when the electronic device operates in a preset operation mode and a network state is a constraint service/no service state, according to an embodiment of the disclosure.

FIG. 7 is a flowchart for describing a method, performed by the electronic device 1000, of changing operations of searching for a PLMN, when the electronic device 1000 operates in the preset operation mode and the network state is the constraint service/no service state, according to an embodiment of the disclosure.

While describing FIG. 7, operation S710 may be performed after operation S310 of FIG. 3 of monitoring the operation mode of the NAD.

In operation S710, the electronic device 1000 according to an embodiment of the disclosure may identify that the NAD has entered the preset operation mode (e.g., vehicle deactivated, engine shut off, processor in sleep mode, while NAD remains operative). Because this has been described in the above embodiments of the disclosure, redundant descriptions are omitted.

In operation S720, the electronic device 1000 according to an embodiment of the disclosure may check the network service state obtained by the NAD. For example, the electronic device 1000 may identify whether the network state of the NAD is a VPLMN-connected state (roaming state), a constraint service state, a no service state, or an HPLMN-connected state.

The electronic device 1000 according to an embodiment of the disclosure may perform operation S730 when the network state obtained by the NAD is identified to be the constraint service state or when the network state of the NAD is identified to be the no service state.

In operation S730, the electronic device 1000 according to an embodiment of the disclosure may initiate the PLMN selection operation. Here, the PLMN selection operation denotes an operation of the NAD searching for and selecting a PLMN. Here, because a current network state of the NAD is the constraint service state or no service state, the PLMN selection operation denotes an operation of searching for a new PLMN from which to access service and/or an increased range of services.

According to an embodiment of the disclosure, the electronic device 1000 may search for a "registered" RPLMN, or an equivalent PLMN of the RPLMN. In this case, the RPLMN denotes a PLMN having a location registration due to a historical connection of the electronic device 1000 with the RPLMN.

Alternatively, the PLMN searched for by the electronic device 1000 may be an EHPLMN or HPLMN. The electronic device 1000 may register the EHPLMN when it is determined that a location of the electronic device 1000 is within a coverage area of the EHPLMN. In this case, the registered EHPLMN of the electronic device 1000 is the RPLMN. Also, the electronic device 1000 may register the HPLMN when there is no list of EHPLMN or a list of EHPLMN is empty and the HPLMN is available. In this case, the registered HPLMN of the electronic device 1000 is the RPLMN.

In operation S740, the electronic device 1000 according to an embodiment of the disclosure may reidentify whether the network service state is the constraint service or no service state. In other words, the electronic device 1000 may identify the network state of the NAD.

The electronic device 1000 may end the PLMN selection operation when, as per operation S740, the electronic device 1000 has connected to the RPLMN, equivalent PLMN, HPLMN, or EHPLMN, and thus the communication service is now available.

When the identified network state is still the constraint service or no service state, the electronic device 1000 may perform operation S750.

In operation S750, the electronic device 1000 according to an embodiment of the disclosure may change the PLMN search cycle. Here, the PLMN search cycle may initially be set to a preset search cycle, and may be stored in the USIM of the electronic device 1000.

According to an embodiment of the disclosure, the electronic device 1000 may change the PLMN search cycle by increasing the time of the preset search cycle. For example, a default value of the preset PLMN search cycle may be 6 minutes. In this case, the electronic device 1000 may change the default value of the preset PLMN search cycle from 6 minutes to 120 minutes, and the changed default value of the search cycle may be stored in the USIM.

In operation S760, the electronic device 1000 according to an embodiment of the disclosure may perform the PLMN selection operation, based on the changed search cycle. For example, when the PLMN search cycle is changed from 6 minutes to 120 minutes, the electronic device 1000 may search for the PLMN every 120 minutes to access the PLMN, rather than every 6 minutes.

According to an embodiment of the disclosure, the electronic device 1000 may identify whether a preset time has elapsed after the PLMN search cycle is changed. When the preset time has elapsed, the electronic device 1000 may disable the PLMN search.

For example, the PLMN search cycle T may be defined to be N×6 minutes (here, N is a value between 0 and 255), the preset search cycle stored in the USIM of the electronic device 1000 may be 6 minutes (N=1), and the changed search cycle may be 120 minutes (N=20). Also, the preset time may be 1530 minutes (N=255, the maximum value of N). When the preset time, i.e., 1530 minutes, has elapsed, the electronic device 1000 may disable the PLMN search.

Also, according to an embodiment of the disclosure, the electronic device 1000 may identify whether the preset time has elapsed after the PLMN search cycle is changed.

After the NAD has entered the preset operation mode, the network state is the constraint service or no service state, and the PLMN search cycle is changed, the electronic device 1000 may identify whether the preset time has elapsed. When the preset time has elapsed, the electronic device 1000 may disable the PLMN search.

Also, when the preset time has elapsed after the PLMN search is disabled, the electronic device 1000 may provide a user interface for enabling an operation of the electronic device 1000 searching for the PLMN. For example, the electronic device 1000 may provide a notification message to a user.

Meanwhile, when a vehicle on which the electronic device 1000 according to an embodiment of the disclosure is mounted has moved to another county and roaming is not possible because there is no roaming agreement with communication operators of the moved country, the network state of the electronic device 1000 may be in the constraint service state. This will be further described with reference to FIG. 8.

Figure 8:
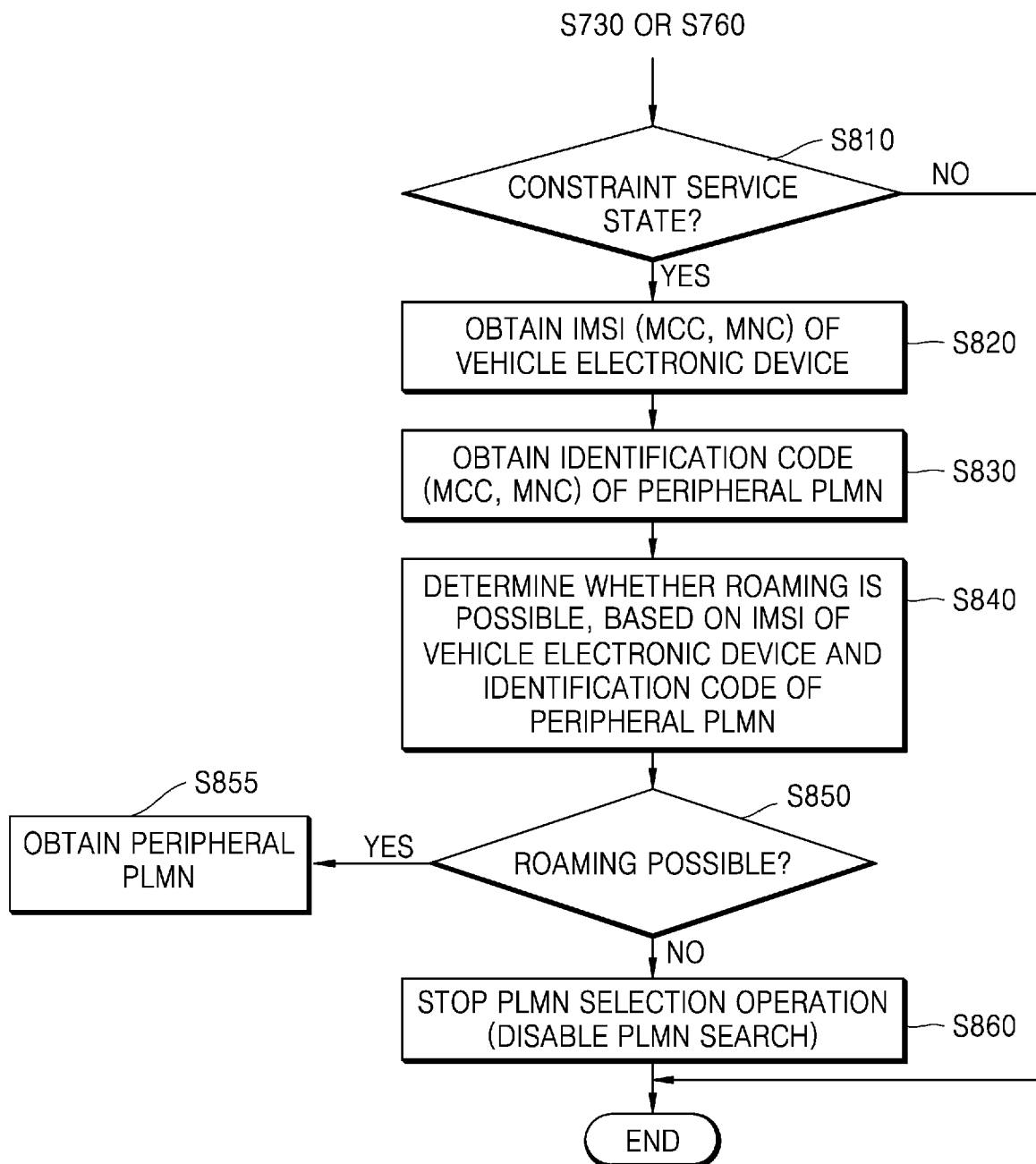
FIG. 8 is a flowchart for further describing a method, performed by an electronic device for a vehicle, of changing operations of searching for a PLMN, when the electronic device operates in a preset operation mode and a network state is a constraint service state, according to an embodiment of the disclosure.

FIG. 8 is a flowchart for further describing a method, performed by the electronic device 1000, of changing the operations of searching for a PLMN, when the electronic device 1000 operates in the preset operation mode and the network state is a constraint service state, according to an embodiment of the disclosure.

According to an embodiment of the disclosure, operations S810 through S860 may be performed after operation S730 of FIG. 7 is performed. In this case, operations S740 through S760 of FIG. 7 may be replaced by operations S810 through S860. However, the disclosure is not limited thereto, and operations S810 through S860 may be additionally performed after operation S760 of FIG. 7 is performed, according to another embodiment of the disclosure.

In operation S810, the electronic device 1000 according to an embodiment of the disclosure may redetermine whether the network service state indicates the constraint service state. When the NAD is connected to a PLMN capable of providing communication service after executing the PLMN search, the electronic device 1000 may terminate the PLMN selection operation. However, when the network state of the NAD remains in the constraint service state, the electronic device 1000 may perform operation S820.

In operation S820, the electronic device 1000 according to an embodiment of the disclosure may obtain IMSI of the electronic device 1000. The IMSI of the electronic device 1000 may include a MCC and MNC.

In operation S830, the electronic device 1000 according to an embodiment of the disclosure may obtain an identification code of a found peripheral PLMN. The electronic device 1000 may identify a PLMN found at a current location of the electronic device 1000. An identification code of the PLMN may include MCC and MNC.

In operation S840, the electronic device 1000 according to an embodiment of the disclosure may determine whether roaming is possible for the NAD, based on the IMSI of the electronic device 1000 and the identification code of the peripheral PLMN.

According to an embodiment of the disclosure, the electronic device 1000 may configure a database based on data of a roaming agreement, the data including MCC and MNC values of a specific communication operator, an MCC of a country corresponding to an MCC of the specific communication operator, and an MNC of another communication operator corresponding to an MNC of the specific communication operator, which may be received from the server 2000. The electronic device 1000 may receive the data of the roaming agreement from the server 2000, while the vehicle is activated and the engine is running, and store the same in a memory.

The electronic device 1000 may determine whether peripheral PLMNs detected by the electronic device 1000 are capable of roaming, based on the data of the roaming agreement.

In operation S850, the electronic device 1000 according to an embodiment of the disclosure may identify whether any of the detected PLMNs are capable of roaming.

In operation S855, when a particular peripheral PLMN is identified as capable of roaming, the electronic device 1000 according to an embodiment of the disclosure may connect to the particular peripheral PLMN and establish communication service with the same.

In operation S860, the electronic device 1000 according to an embodiment of the disclosure may terminate the PLMN selection operation when determining that roaming is not possible. Also, when a preset time has elapsed, the electronic device 1000 may disable the PLMN search. The electronic device 1000 may change the PLMN search cycle T to 0 (N=0) to terminate the PLMN selection operation such that the electronic device 1000 ceases execution of the PLMN search.

Figure 9:
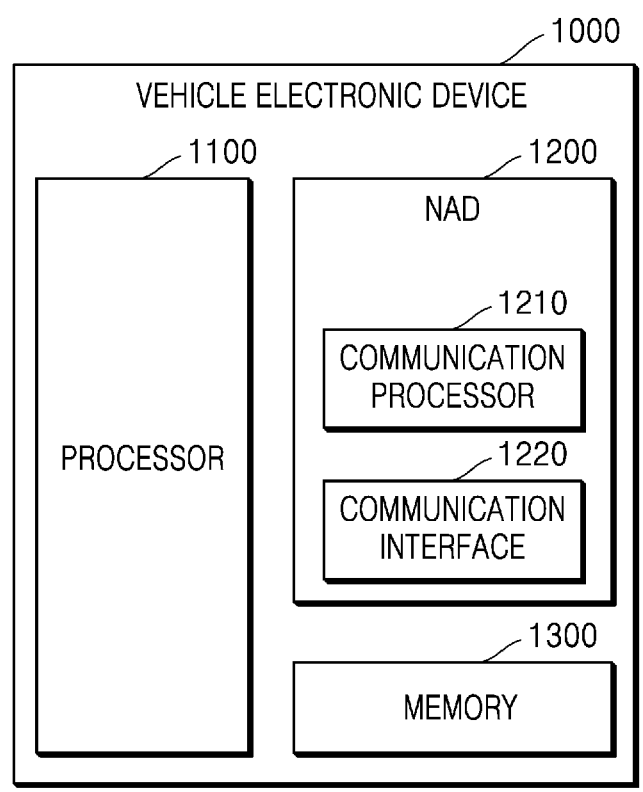
FIG. 9 is a block diagram of a configuration of an electronic device for a vehicle, according to an embodiment of the disclosure.

FIG. 9 is a block diagram of a configuration of the electronic device 1000, according to an embodiment of the disclosure.

Referring to FIG. 9, the electronic device 1000 according to an embodiment of the disclosure may include a processor 1100, an NAD 1200, and a memory 1300. The NAD 1200 may include a communication processor 1210 and a communication interface 1220.

The electronic device 1000 according to an embodiment of the disclosure may implement in-vehicle infotainment (IVI) technology. For example, the electronic device 1000 may provide a service, information, and/or content to a user. The electronic device 1000 may obtain information utilized to drive or use a vehicle, by performing communication between the vehicle and an external device. Alternatively, the electronic device 1000 may provide the service, information, and/or content to the user by performing communication between the vehicle and the external device.

The processor 1100 may control overall operations of the electronic device 1000. For example, the processor 1100 may execute one or more instructions of a program stored in the memory 1300 to provide the service, information, and/or content to the user.

The processor 1100 may be implemented using at least one of, for example, a central processing unit (CPU), a micro-processor, a graphics processing unit (GPU), an application specific integrated circuit (ASIC), a digital signal processor (DSP), a digital signal processing device (DSPD), a programmable logic device (PLD), a field programmable gate array (FPGA), an application processor (AP), a neural processing unit, or an artificial intelligence-dedicated processor designed in a hardware structure specialized for processing of an artificial intelligence model, but is not limited thereto.

According to an embodiment of the disclosure, the processor 1100 may operate in a sleep mode when an engine of the vehicle is deactivated and shut off.

The NAD 1200 may control data transmission/reception of the electronic device 1000, including communications between the vehicle and an external electronic device (such as, for example, a server, a mobile device, or the like). The NAD 1200 may execute a search for a PLMN which can provide communication services to the electronic device 1000.

The communication processor 1210 may control overall operations of the NAD 1200. For example, the communication processor 1210 may execute one or more instructions of a program stored in the memory 1300 that cause the NAD 1200 to search for and access a PLMN.

The communication processor 1210 may include at least one of a central processing unit (CPU), a microprocessor, an application specific integrated circuit (ASIC), a digital signal processor (DSP), a digital signal processing device (DSPD), a programmable logic device (PLD), a field programmable gate array (FPGA), a telematics control unit (TCU), or a communication processor (CP) module, but is not limited thereto. Here, the CP module may include a modem chipset, and a network may perform communication with an external electronic device via a communication network according to the 3rd generation (3G), 4G, 5G, or 6G communication standard.

The communication interface 1220 may perform data communication with a server or base station by using at least one of data communication methods including wireless local area network (LAN), Wi-Fi, Bluetooth, ZigBee, Wi-Fi direct (WFD), infrared data association (IrDA), Bluetooth low energy (BLE), wireless broadband Internet (Wibro), World interoperability for microwave access (WiMAX), shared wireless access protocol (SWAP), wireless gigabit alliance (WiGig), and radio frequency (RF) communication.

The communication interface 1220 may include at least one communication module performing wireless communication. For example, the communication interface 1220 may include at least one of an antenna, a Bluetooth module, a Wi-Fi module, a global positioning system (GPS) module, or an RF module.

Also, the communication interface 1220 may include at least one communication module performing communication according to the communication standard, such as BLE, near field communication (NFC)/radio frequency identification (RFID), WFD, ultra-wideband (UWB), and/or ZigBee.

The memory 1300 may store instructions, data structures, and program codes, which may be read by the processor 1100 and communication processor 1210. According to embodiments of the disclosure, operations performed by the processor 1100 and communication processor 1210 may be implemented by executing instructions or codes of a program stored in the memory 1300.

The memory 1300 may include a nonvolatile memory including at least one of a flash memory type, a hard disk type, a multimedia card micro type, a card type memory (for example, a secure digital (SD) or an extreme digital (XD) memory), a random access memory (RAM), a static RAM (SRAM), a read-only memory (ROM), an electrically erasable programmable ROM (EEPROM), a programmable ROM (PROM), a magnetic memory, a magnetic disk, or an optical disk, and a volatile memory such as RAM or SRAM.

Figure 10:
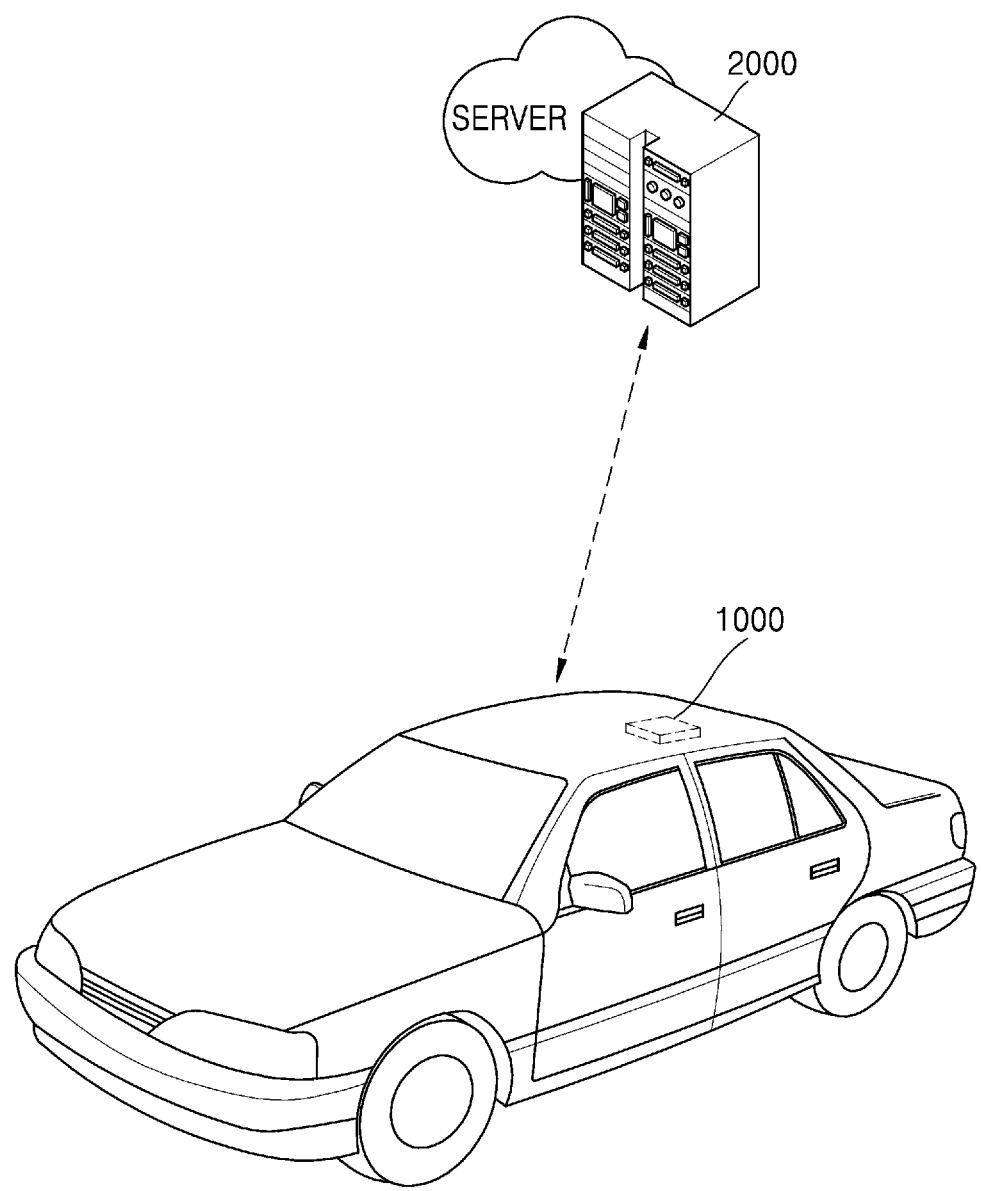
FIG. 10 is a diagram of an electronic device for a vehicle, communicating with a server, according to an embodiment of the disclosure.

FIG. 10 is a diagram of an electronic device for a vehicle communicating with a server, according to an embodiment of the disclosure.

Referring to FIG. 10, the server 2000 may include a server, a server system, a server-based apparatus, or the like, which transmits/receives data to/from the electronic device 1000 via a communication network and processes the data. The communication network may be a PLMN according to the above embodiments of the disclosure.

The server 2000 may transmit, to the electronic device 1000 via the communication network, pieces of data related to a roaming agreement, which include MCC and MNC values of a specific communication operator, an MCC of a country corresponding to a MCC of the specific communication operator, and a MNC of another communication operator corresponding to an MNC of the specific communication operator.

The electronic device 1000 may receive the pieces of data related to the roaming agreement from the server 2000 while an engine of a vehicle is turned on, and store the same.

Figure 11:
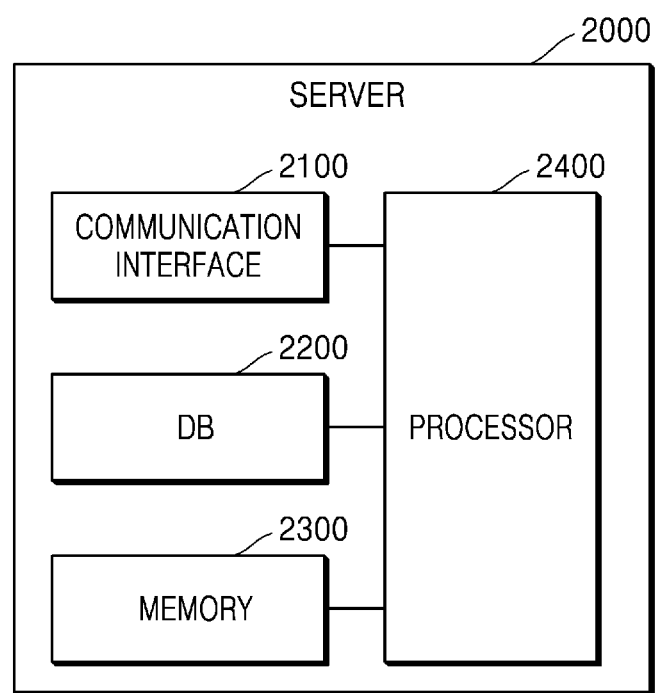
FIG. 11 is a block diagram showing a configuration of a server, according to an embodiment of the disclosure.

FIG. 11 is a block diagram showing a configuration of the server 2000, according to an embodiment of the disclosure.

The server 2000 according to an embodiment of the disclosure may be mutually connected to the electronic device 1000 in a wireless communication manner, and perform data communication.

The server 2000 according to an embodiment of the disclosure may at least include a communication interface 2100, a database (DB) 2200, a memory 2300, and a processor 2400.

The communication interface 2100 according to an embodiment of the disclosure may include one or more components enabling communication via a local area network (LAN), a wide area network (WAN), a value-added network (VAN), a mobile radio communication network, a satellite communication network, or a combination thereof.

The communication interface 2100 according to an embodiment of the disclosure may transmit, to the electronic device 1000, pieces of data related to a roaming agreement. Also, the communication interface 2100 may transmit, to the electronic device 1000, a service, information, and/or content so as to provide the service, information, and/or content to a user.

The DB 2200 may store data received from the electronic device 1000, and data to be provided to the electronic device 1000 by another external device (not shown) or the server 2000.

The memory 2300 may store various pieces of data, programs, or applications to drive and control the server 2000. The program stored in the memory 2300 may include one or more instructions. The program (one or more instructions) or application stored in the memory 2300 may be executed by the processor 2400.

The processor 2400 may control the server 2000 in general. The processor 2400 according to an embodiment of the disclosure may execute one or more programs stored in the memory 2300.

The processor 2400 according to an embodiment of the disclosure may include an application processor (AP), a central processing unit (CPU), a graphics processing unit (GPU), a neural processor, or an AI-dedicated processor designed in a hardware structure specialized for processing of an AI model.

The processor 2400 may control the server 2000 to provide, to the electronic device 1000, the pieces of data related to the roaming agreement, service, information, and content.

Meanwhile, the block diagram of the electronic device 1000 shown in FIG. 9 and the block diagram of the server 2000 shown in FIG. 11 are block diagrams for embodiments of the disclosure. Components of the block diagram may be integrated, a component may be added, or a component may be omitted according to the specification of each device that is actually implemented. In other words, two or more components may be integrated into one component or one component may be divided into two or more components when necessary. Also, a function performed by each block is only for describing embodiments of the disclosure and specific operations or apparatuses do not limit the scope of right of the disclosure.

An operating method of an electronic device, according to an embodiment of the disclosure, may be recorded on a computer-readable recording medium by being implemented in a form of program commands executed by using various computers. The computer-readable recording medium may include at least one of a program command, a data file, or a data structure. The program commands recorded in the computer-readable recording medium may be specially designed or well known to one of ordinary skill in the computer software field. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as read-only memory (ROM), random-access memory (RAM), and flash memory. Examples of the computer command include machine codes generated by a compiler, and high-level language codes executable by a computer by using an interpreter.

Furthermore, an operating method of an electronic device, according to the embodiments of the disclosure may be provided by being included in a computer program product. The computer program products are products that can be traded between sellers and buyers.

The computer program product may include a software program or a computer-readable storage medium storing a software program. For example, the computer program product may include a product (for example, a downloadable application) in a form of a software program that is electronically distributable through a manufacturer of the electronic device or an electronic market. For electronic distribution, at least a part of the software program may be stored in the storage medium or temporarily generated. In this case, the storage medium may be a storage medium of a server of a manufacturer, a server of an electronic market, or a relay server that temporarily stores the software program.

The computer program product may include a storage medium of a server or a storage medium of a client apparatus in a system including the server and the client apparatus. Alternatively, when there is a third device, e.g., a smartphone, that communicates with the server or the client apparatus, the computer program product may include a storage medium of the third device. Alternatively, the computer program product may include the software program transmitted from the server to the client apparatus or the third device, or transmitted from the third device to the client apparatus.

In this case, one of the server, the client apparatus, and the third device may perform a method according to embodiments of the disclosure by executing the computer program product. Alternatively, two or more of the server, the client apparatus, and the third device may execute the computer program product to perform the method according to the embodiments of the disclosure in a distributed fashion.

While the embodiments of the disclosure have been particularly shown and described in detail, it will be understood by one of ordinary skill in the art that various changes in form and details may be made therein without departing from the spirit and scope of the disclosure as defined by the following claims.

The invention claimed is:

1. An operating method of an electronic device for a vehicle, the operating method comprising:
   monitoring whether a network access device of the electronic device enters a preset operation mode in which the network access device remains activated while a processor of the electronic device is in a sleep mode;
   based on detecting that the network access device enters the preset operation mode, identifying a network state of the network access device;
   based on the network state of the network access device, changing a search cycle of a network search as executed by the network access device; and
   executing the network search based on the changed search cycle.

2. The operating method of claim 1, wherein the network access device enters the preset operation mode as an engine of the vehicle is deactivated.

3. The operating method of claim 1, wherein changing the search cycle is further based on detecting an existing connection of the network access device to a visited public land mobile network (VPLMN), and
   wherein the network search includes searching for a higher priority public land mobile network (HPPLMN) associated with a preset priority tier that is higher than a preset priority tier of the VPLMN.

4. The operating method of claim 3, wherein searching for the HPPLMN is periodically re-executed according to a preset search cycle time, and
   wherein the preset search cycle time is changed when the HPPLMN is not detected.

5. The operating method of claim 4, wherein changing the preset search cycle time includes increasing a time between each periodic re-execution of the search for the HPPLMN.

6. The operating method of claim 4, further comprising:
   detecting lapse of a preset time starting from a time at which the preset search cycle time is changed; and
   based on detecting the lapse, disabling periodic re-execution of the search for the HPPLMN.

7. The operating method of claim 1, wherein the identified network state includes a constrained-service state, in which at least function communication services to the network access device are constrained.

8. The operating method of claim 7, wherein changing the search cycle is based on detecting that the identified network state including the constrained-service state,
   wherein executing the network search is based on a preset search cycle time, and
   wherein when a public land mobile network (PLMN) is not found by the executed network search, the preset search cycle time is changed.

9. The operating method of claim 8, further comprising:
   after detecting lapse of a preset time starting from a time at which the preset search cycle time is changed, outputting, via a display, a user interface interactable to disable the network search for the PLMN.

10. The operating method of claim 1, further comprising:
    redetermining the network state of the network access device;
    based on detecting, from the redetermination, that the network access device is in a constrained-service state, requesting an identification code of a public land mobile network (PLMN) detectable by the network access device;
    after receiving the identification code of the PLMN, determining whether roaming is available, based on the received identification code of the PLMN and an international mobile subscriber identity (IMSI) of the electronic device; and when roaming is unavailable, disabling the network search.

11. An electronic device for a vehicle, the electronic device comprising:
a memory storing one or more instructions;
a network access device; and
a processor,
wherein the one or more instructions are executable by the processor to cause the electronic device to:
monitor whether the network access device enters a preset operation mode, in which the network access device remains activated while the processor is in a sleep mode,
based on detecting that the network access device enters the preset operation mode, identify a network state of the network access device,
based at least on the network state of the network access device, change a search cycle of a network search as executed by the network access device, and
execute the network search based on the changed search cycle.

12. The electronic device of claim 11, wherein the network access device enters the preset operation mode as an engine of the vehicle is deactivated.

13. The electronic device of claim 11, wherein changing the search cycle is further based on detecting an existing connection of the network access device to a visited public land mobile network (VPLMN), and
wherein the network search includes searching for a higher priority public land mobile network (HPPLMN) associated with a preset priority tier that is higher than a preset priority tier of the VPLMN.

14. The electronic device of claim 13, wherein searching for the HPPLMN is periodically re-executed according to a preset search cycle time, and
wherein the preset search cycle time is changed when the HPPLMN is not detected.

15. The electronic device of claim 14, wherein the one or more instructions are further executable by the processor to:
detect lapse of a preset time starting from a time at which the preset search cycle time is changed; and
based on detecting the lapse, disable periodic re-execution of the search for the HPPLMN.

16. The electronic device of claim 11, wherein the identified network state includes a constrained-service state, in which at least function communication services to the network access device are constrained.

17. The electronic device of claim 16, wherein changing the search cycle is based on detecting that the identified network state including the constrained-service state,
wherein executing the network search is based on a preset search cycle time, and
wherein when a public land mobile network (PLMN) is not found by the executed network search, the preset search cycle time is changed.

18. The electronic device of claim 17, wherein the one or more instructions are executable by the processor to:
after detecting lapse of a preset time starting from a time at which the preset search cycle time is changed, output, via a display, a user interface interactable to disable the network search for the PLMN.

19. The electronic device of claim 11, wherein the one or more instructions are executable by the processor to:
redetermine the network state of the network access device;
based on detecting from the redetermination that the network access device is in a constrained-service state, request an identification code of a public land mobile network (PLMN) detectable by the network access device;
after receiving the identification code of the PLMN, determine whether roaming is available, based on the received identification code of the PLMN and an international mobile subscriber identity (IMSI) of the electronic device; and
when roaming is unavailable, disable the network search.

20. A non-transitory computer-readable recording medium having recorded thereon a program for executing, on an electronic device for a vehicle, operations of:
monitoring, via at least one processor, whether a network access device of the electronic device enters a preset operation mode in which the network access device remains activated while a processor of the electronic device is in a sleep mode;
based on detecting that the network access device enters the preset operation mode, identifying a network state of the network access device;
based at least on the network state of the network access device, changing a search cycle of a network search as executed by the network access device; and
executing the network search based on the changed search cycle.

* * * * *